United States Patent
Tsuchida

(10) Patent No.: US 10,739,046 B2
(45) Date of Patent: Aug. 11, 2020

(54) COMPRESSOR, REFRIGERATION CYCLE APPARATUS, AND AIR CONDITIONER

(71) Applicant: Mitsubishi Electric Corporation, Tokyo (JP)

(72) Inventor: Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 216 days.

(21) Appl. No.: 15/311,563

(22) PCT Filed: Jun. 17, 2014

(86) PCT No.: PCT/JP2014/066008
§ 371 (c)(1),
(2) Date: Nov. 16, 2016

(87) PCT Pub. No.: WO2015/193963
PCT Pub. Date: Dec. 23, 2015

(65) Prior Publication Data
US 2017/0082329 A1 Mar. 23, 2017

(51) Int. Cl.
*H02K 7/075* (2006.01)
*F25B 31/02* (2006.01)
(Continued)

(52) U.S. Cl.
CPC ............ *F25B 31/026* (2013.01); *F04C 23/02* (2013.01); *F04C 29/0085* (2013.01);
(Continued)

(58) Field of Classification Search
CPC .......... H02K 7/0003; H02K 7/14; H02K 7/04; H02K 7/061; H02K 7/063; H02K 7/075;
(Continued)

(56) References Cited

U.S. PATENT DOCUMENTS

2002/0130574 A1* 9/2002 Takahata ................ H02K 21/16
310/156.53
2006/0097604 A1* 5/2006 Adaniya .............. H02K 21/024
310/261.1
(Continued)

FOREIGN PATENT DOCUMENTS

| CN | 1127030 A | 7/1996 |
| CN | 1823228 A | 8/2006 |

(Continued)

OTHER PUBLICATIONS

International Search Report of the International Searching Authority dated Sep. 9, 2014 for the corresponding international application No. PCT/JP2014/066008 (and English translation).

(Continued)

*Primary Examiner* — Emily P Pham
*Assistant Examiner* — Bryan R Perez
(74) *Attorney, Agent, or Firm* — Posz Law Group, PLC

(57) ABSTRACT

A compressor is configured such that an axis center of a rotating shaft for transmitting rotation of a rotor to a compressing unit for compressing a refrigerant is offset from a rotor center of the rotor, and, when the rotor is divided into, with respect to the rotor center, a first portion located on a side in a direction from the axis center to the rotor center and a second portion located on a side in a direction from the rotor center to the axis center, a magnetic force of the first portion is stronger than a magnetic force of the second portion. This configuration allows the rotor to generate non-uniform magnetic attractive forces during the rotation of the rotor and thereby can suppress vibration generated due to rotation of an eccentric portion of the compressing unit and reduce noise.

8 Claims, 18 Drawing Sheets

(51) Int. Cl.
  *H02K 1/27* (2006.01)
  *H02K 21/16* (2006.01)
  *F04C 23/02* (2006.01)
  *F04C 29/00* (2006.01)
  *H02K 1/14* (2006.01)
  *H02K 7/14* (2006.01)
  *F04C 23/00* (2006.01)

(52) U.S. Cl.
  CPC ............ *H02K 1/146* (2013.01); *H02K 1/276* (2013.01); *H02K 1/2706* (2013.01); *H02K 7/075* (2013.01); *H02K 21/16* (2013.01); *F04C 23/008* (2013.01); *F04C 2240/40* (2013.01); *F04C 2240/60* (2013.01); *F04C 2270/12* (2013.01); *F04C 2270/13* (2013.01); *F25B 2500/13* (2013.01); *H02K 7/14* (2013.01); *H02K 2201/03* (2013.01); *H02K 2213/03* (2013.01)

(58) Field of Classification Search
  CPC .... H02K 2201/03; H02K 1/27; H02K 1/2706; H02K 1/272; H02K 1/276; H02K 1/146; H02K 21/16; H02K 2213/03; F25B 31/026; F25B 2500/13; F04C 23/02; F04C 23/008; F04C 29/0085; F04C 2270/13; F04C 2270/12; F04C 2240/60; F04C 2240/40
  USPC ................ 310/51, 216.015, 216.016, 156.08
  See application file for complete search history.

(56) References Cited

U.S. PATENT DOCUMENTS

| | | |
|---|---|---|
| 2007/0180841 A1 | 8/2007 | Bae et al. |
| 2008/0136280 A1* | 6/2008 | Hsiao ..................... F04B 35/04 310/114 |
| 2008/0238232 A1* | 10/2008 | Bando .................... H02K 1/246 310/126 |
| 2011/0193439 A1* | 8/2011 | Yabe ...................... H02K 1/276 310/156.38 |
| 2012/0112593 A1* | 5/2012 | Araki ..................... H02K 1/276 310/156.57 |
| 2013/0140933 A1* | 6/2013 | Katsuhisa .............. H02K 29/03 310/156.08 |
| 2014/0246940 A1 | 9/2014 | Murakami et al. |
| 2014/0286807 A1* | 9/2014 | Sekiya ................ F01C 21/0863 418/55.1 |

FOREIGN PATENT DOCUMENTS

| | | |
|---|---|---|
| JP | 09-200986 A | 7/1997 |
| JP | 2004-215429 A | 7/2004 |
| JP | 2005-042632 A | 2/2005 |
| JP | 2011-101544 A | 5/2011 |
| JP | 2012-137013 A | 7/2012 |
| JP | 2013-034303 A | 2/2013 |
| JP | 2014-110660 A | 6/2014 |
| WO | 95/02133 A1 | 1/1995 |
| WO | 2007/018261 A1 | 2/2007 |
| WO | 2013/073264 A1 | 5/2013 |

OTHER PUBLICATIONS

Office Action dated Jul. 4, 2018 in the corresponding Chinese Patent Application No. 201480079349.7 (and English translation).
Office action dated Jun. 19, 2018 issued in corresponding JP patent application No. 2017-157014 (and English translation thereof).

* cited by examiner

L1>L2

W1>W2

W1<W2

T1>T2

T1<T2

COMPRESSOR, REFRIGERATION CYCLE APPARATUS, AND AIR CONDITIONER

CROSS REFERENCE TO RELATED APPLICATION

This application is a U.S. national stage application of International Patent Application No. PCT/JP2014/066008 filed on Jun. 17, 2014, the disclosure of which is incorporated herein by reference.

TECHNICAL FIELD

The present invention relates to a compressor, a refrigeration cycle apparatus, and an air conditioner.

BACKGROUND

Motors in compressors for use in devices like refrigeration cycle apparatuses, an increased torque is required during compression of a refrigerant and a reduced torque is required during discharge of the compressed high pressure refrigerant, thereby causing torque fluctuations.

Generation of such torque fluctuations results in deflections in a shaft, causing vibration and noise when compressors are operated. To suppress such vibration and noise, conventional techniques represented by Patent Literature 1 to be described below employ a component called a balance weight in a rotor. Such a balance weight is generally made of a non-magnetic material to avoid a reduction in magnetic force of a motor.

PATENT LITERATURE

Patent Literature 1: Japanese Patent Application Laid-Open No. H9-200986

A balance weight has a high specific gravity, and it is generally made of a non-magnetic material to avoid a reduction in magnetic force of a motor. Accordingly, conventional compressors represented by one described in Patent Literature 1 are problematic in that the need to reduce vibration and noise caused when a rotor is rotated cannot be satisfied without using a balance weight.

SUMMARY

The present invention has been achieved in view of the above, and an object of the present invention is to provide a compressor, a refrigeration cycle apparatus, and an air conditioner that are capable of suppressing vibration while keeping a low cost.

To solve the above described problem and achieve the object, a compressor according to the present invention, an axis center of a rotating shaft for transmitting rotation of a rotor to a compressing unit for compressing a refrigerant is offset from a radial direction center of the rotor. When the rotor is divided into, with respect to the radial direction center of the rotor, a first portion located on a side in a direction from the axis center to the radial direction center of the rotor and a second portion located on a side in a direction from the radial direction center of the rotor to the axis center, a magnetic force of the first portion is stronger than a magnetic force of the second portion.

This invention produces an effect of being capable of suppressing vibration while keeping a low cost.

DETAILED DESCRIPTION

Exemplary embodiments of a compressor, a refrigeration cycle apparatus, and an air conditioner according to the present invention will now be described in detail with reference to the drawings. The present invention is not limited to the embodiments.

First Embodiment

Figure 1:
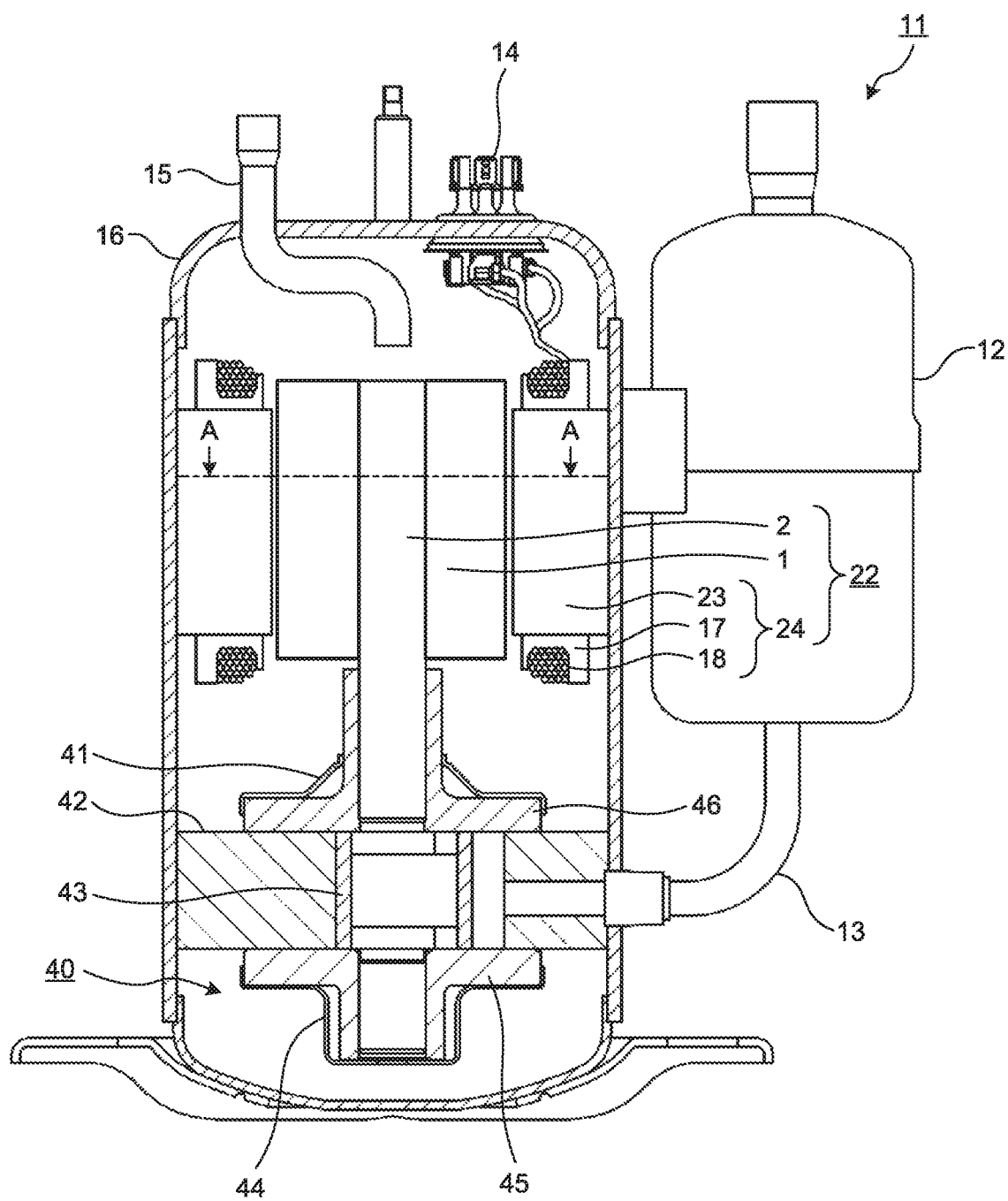
FIG. 1 is a sectional view of a compressor according to a first embodiment of the present invention.
Figure 2:
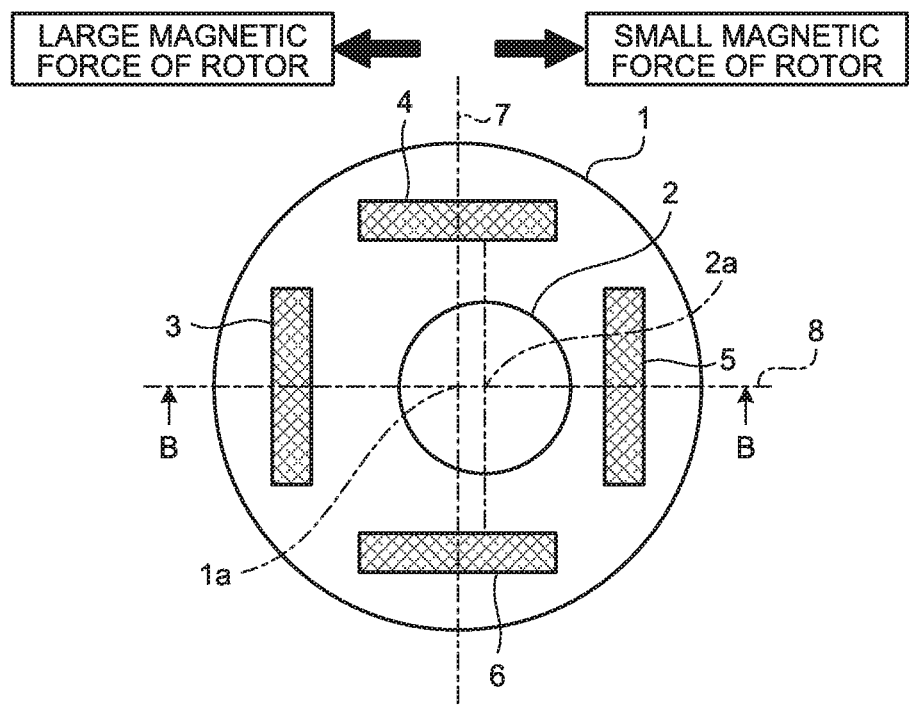
FIG. 2 is a sectional view of a rotor illustrated in FIG. 1.
Figure 3:
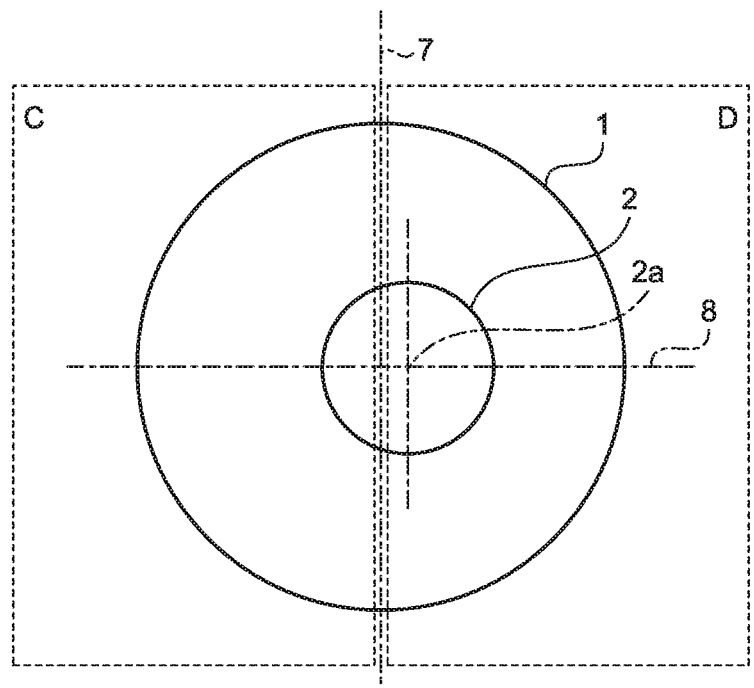
FIG. 3 is a diagram for describing a first portion and a second portion of the rotor illustrated in FIG. 2.
Figure 4:
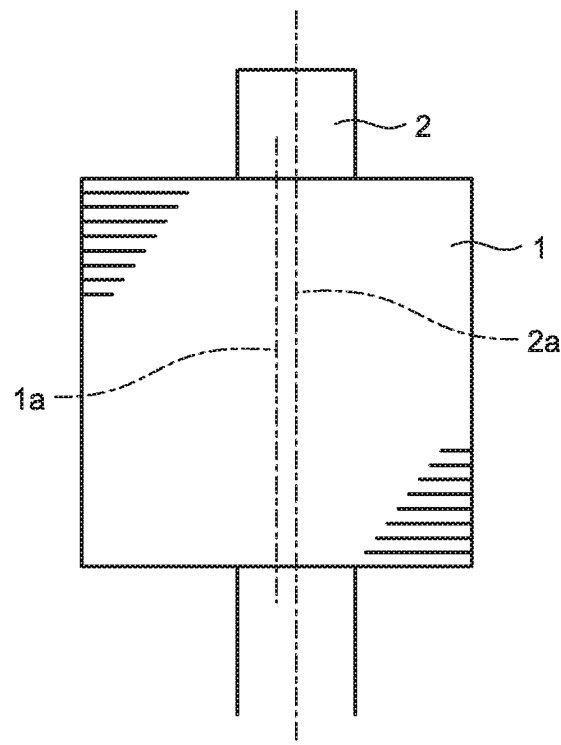
FIG. 4 is a side view of the rotor.
Figure 5:
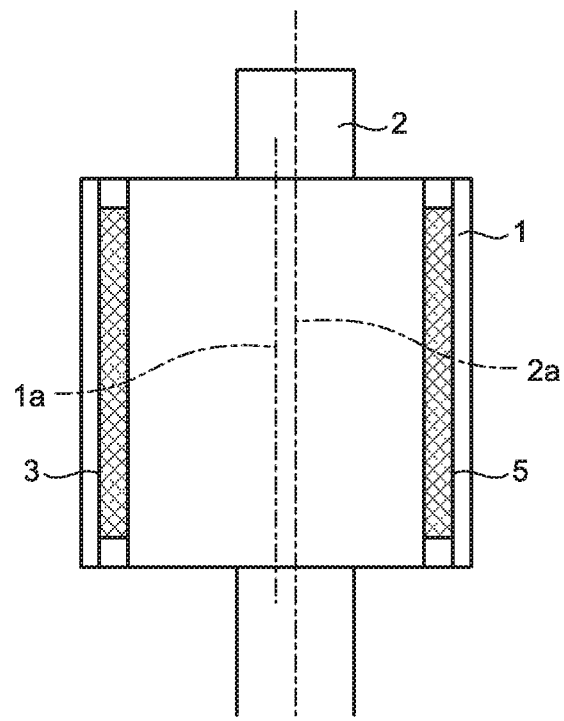
FIG. 5 is a sectional view of the rotor illustrated in FIG. 2, viewed from B-B.
Figure 6:
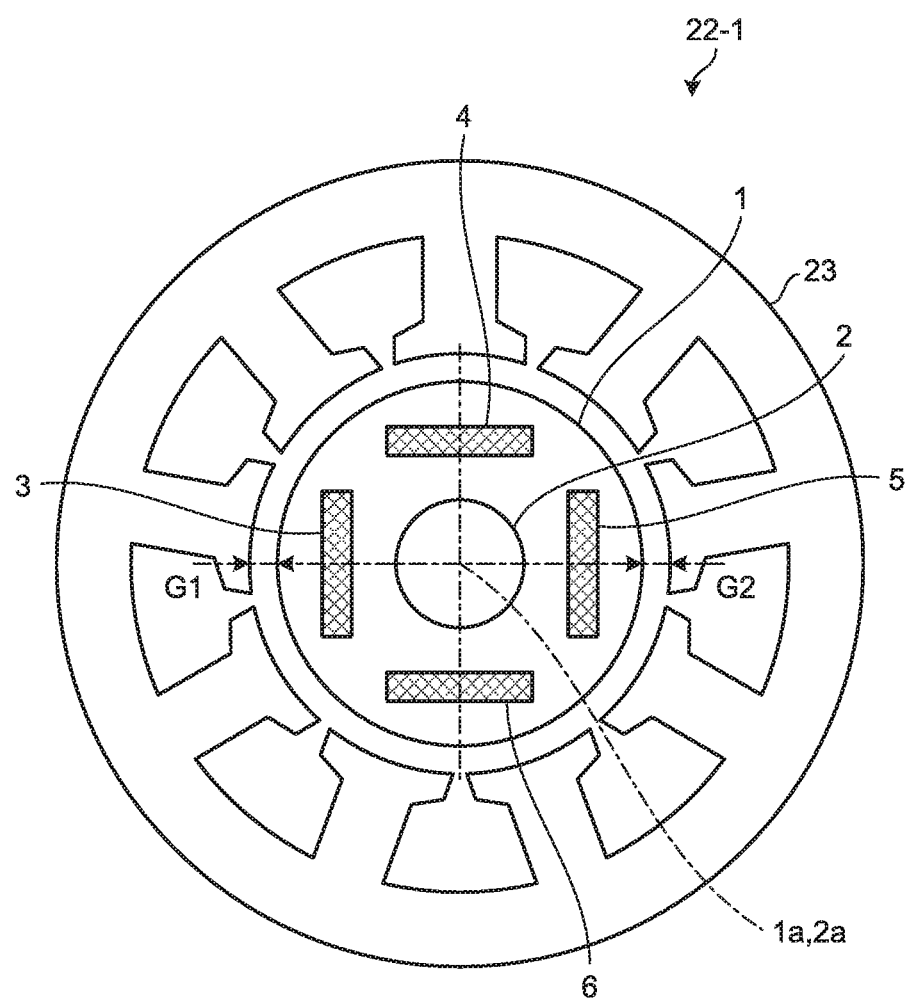
FIG. 6 is a sectional view of a motor for use in a conventional compressor.
Figure 7:
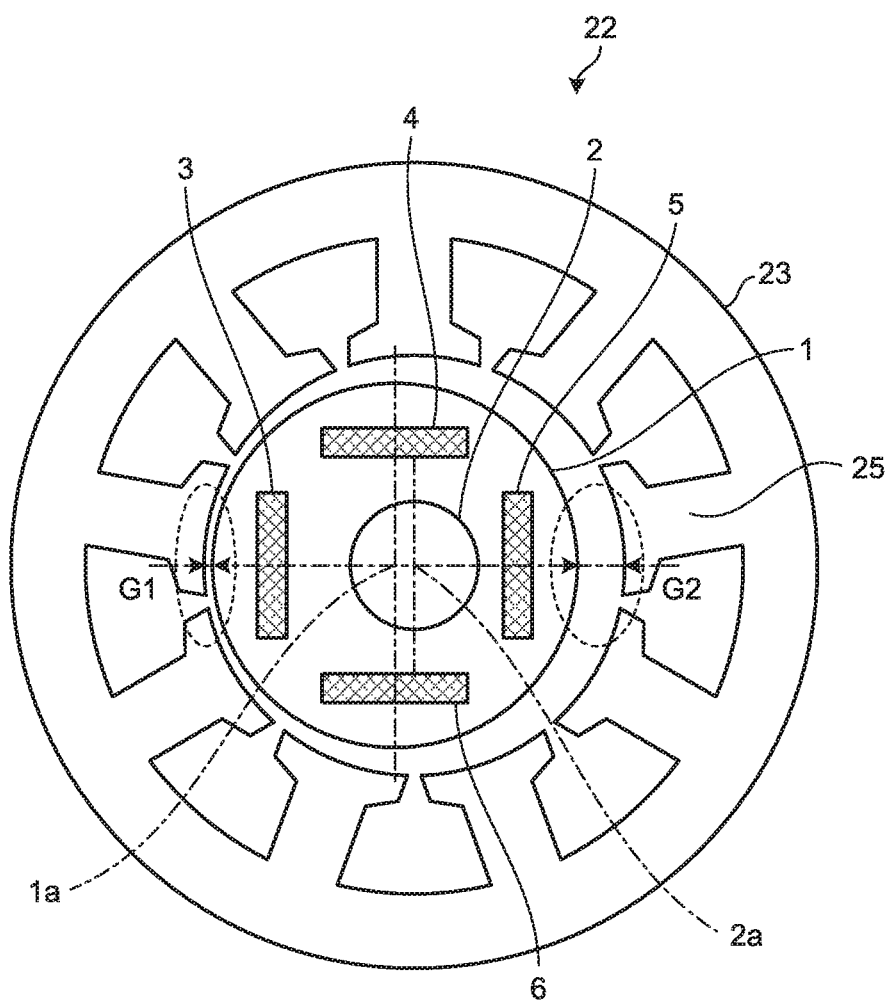
FIG. 7 is a sectional view of a motor illustrated in FIG. 1, viewed from A-A.

FIG. 1 is a sectional view of a compressor according to a first embodiment of the present invention. FIG. 2 is a sectional view of a rotor illustrated in FIG. 1. FIG. 3 is a diagram for describing a first portion and a second portion of the rotor illustrated in FIG. 2. FIG. 4 is a side view of the rotor. FIG. 5 is a sectional view of the rotor illustrated in FIG. 2, viewed from B-B. FIG. 6 is a sectional view of a motor for use in a conventional compressor. FIG. 7 is a sectional view of a motor illustrated in FIG. 1, viewed from A-A.

In a frame 16 of a compressor 11 illustrated in FIG. 1, a motor 22 and a compressing unit 40 are provided. The motor 22 includes a stator 24, a rotor 1, and a rotating shaft 2 and is, for example, a brushless DC motor. The stator 24 includes a winding 18, an insulating section 17, and a stator core 23, and the rotating shaft 2 is disposed in a vicinity of the center of the stator core 23. The motor 22 is used as a motorizing element for the hermetic compressor 11 in the first embodiment, although the motor 22 can be used as a motorizing element for any apparatus other than the compressor 11.

The compressing unit 40 includes: a cylinder 42; a piston 43, in which the rotating shaft 2 to be rotated by the motor 22 is inserted; a pair of upper and lower frames (an upper frame 46 and a lower frame 45), in which the rotating shaft 2 is inserted and which block axial-direction end faces of the cylinder 42; an upper discharge muffler 41 mounted on the upper frame 46; and a lower discharge muffler 44 mounted on the lower frame 45.

The frame 16 is formed by shaping a steel plate having a predetermined thickness into a cylindrical shape by drawing, and a refrigerating machine oil (not shown) for lubricating sliding sections of the compressing unit 40 is stored at the bottom of the frame 16. The rotor 1 is disposed with gaps G1 and G2 (see FIG. 7) in an inner diameter side of the stator core 23. The rotating shaft 2 is rotatably retained by the upper frame 46 and the lower frame 45 provided at a lower portion of the compressor 11. The stator core 23 is retained on an inner circumferential portion of the frame 16 by, for example, shrinkage fitting. To the winding 18 wound around the stator core 23, an electric power is supplied from a glass terminal 14 fixed on the frame 16.

FIG. 7 illustrates: the stator core 23, which is disposed inside the frame 16; the rotor 1, which is disposed in an inner diameter portion of the stator core 23; and the rotating shaft 2. A group of four magnets (a magnet 3, a magnet 4, a magnet 5, and a magnet 6) is inserted in the rotor 1 as an example. The four magnets 3 to 6 are flat-plate-shaped permanent magnets magnetized such that a north pole and a south pole are arranged alternately. A shaft hole (not shown) is formed in the rotor 1 around a center of the rotor 1, and the rotating shaft 2 is coupled in the shaft hole by shrinkage fitting, press fitting, or the like.

The gaps (G1 and G2) are formed between an outer circumferential surface of the rotor 1 and an inner circumferential surface of the stator core 23, and by allowing an electric current with a frequency synchronized with the command number of rotations to pass through the winding 18 (see FIG. 1) of the stator core 23, a rotating magnetic field is generated and the rotor 1 is rotated. The stator core 23 is fabricated by stamping a magnetic steel sheet having a predetermined thickness into a predetermined shape and stacking a plurality of the stamped magnetic steel sheets by calking.

In the illustrated example, the stator core 23 has nine teeth 25 and the rotor 1 has the four magnets 3 to 6, although the numbers of teeth and magnets are not limited to those in the illustrated example. The motor 22 of an IPM (Interior Permanent Magnet) type is employed as an example in the first embodiment, although the motor 22 may be of a type other than the IPM type.

The configuration of the rotor 1, which is a characterizing part of the compressor 11 according to the first embodiment, will now be described specifically.

As illustrated in FIG. 2 to FIG. 5, an axis center 2a of the rotating shaft 2 is shifted with respect to a radial direction center of the rotor 1 (a rotor center 1a). When the rotor 1 is divided into a first portion C located on a side, with respect to the rotor center 1a, in a direction from the axis center 2a to the rotor center 1a (on a side in a left direction in an example in FIG. 2) and a second portion D located on a side, with respect to the rotor center 1a, in a direction from the rotor center 1a to the axis center 2a (on a side in a right direction in the example in FIG. 2), a magnetic force of the first portion C is stronger than a magnetic force of the second portion D.

To describe the first portion C and the second portion D of the rotor 1 specifically, in FIG. 3, a surface that is orthogonal to a line 8 that passes through the rotor center 1a and the axis center 2a is a boundary surface 7, the surface including the rotor center 1a. Here, the first portion C is on the opposite side of the boundary surface 7 from the axis center 2a side, and the second portion D is on the axis center 2a side of the boundary surface 7.

The axis center 2a of the rotating shaft 2 is shifted with respect to the rotor center 1a. Thus, as illustrated in FIG. 7, the gap G1 on a side of the first portion C is narrower than the gap G2 on a side of the second portion D. Here, a magnetic attractive force on a side of the gap G1 is larger than a magnetic attractive force on a side of the gap G2; thus, the rotor 1 generates non-uniform magnetic attractive forces. Such non-uniform magnetic attractive forces can produce an effect similar to that of a rotor 1 including balance weights 30 and 31 (see FIG. 16). For example, vibration generated due to rotation of an eccentric portion (not shown) of the compressing unit 40 illustrated in FIG. 1 can be suppressed, and noise can also be reduced.

Furthermore, since the magnetic force of the first portion C in the rotor 1 is larger than the magnetic force of the second portion D, a magnetic attractive force generated between the first portion C and the stator core 23 further increases, which causes the magnetic attractive force that attracts the rotor 1 to the side of the gap G1 to become even stronger; hence, further noise reduction can be expected.

In contrast, in a conventional common motor 22-1 illustrated in FIG. 6, the position of the rotor center 1a coincides with the position of the axis center 2a, and, thus, the dimensions of the gaps G1 and G2 are constant, which causes a magnetic attractive force generated between the rotor 1 and the stator core 23 during rotation of the rotor 1 to be uniform. Hence, a measure such as including balance weights 30 and 31 to be described hereinafter in the rotor 1 has to be taken.

Some exemplary configurations that cause the magnetic force of the first portion C to be stronger than the magnetic force of the second portion D will now be described.

Figure 8:
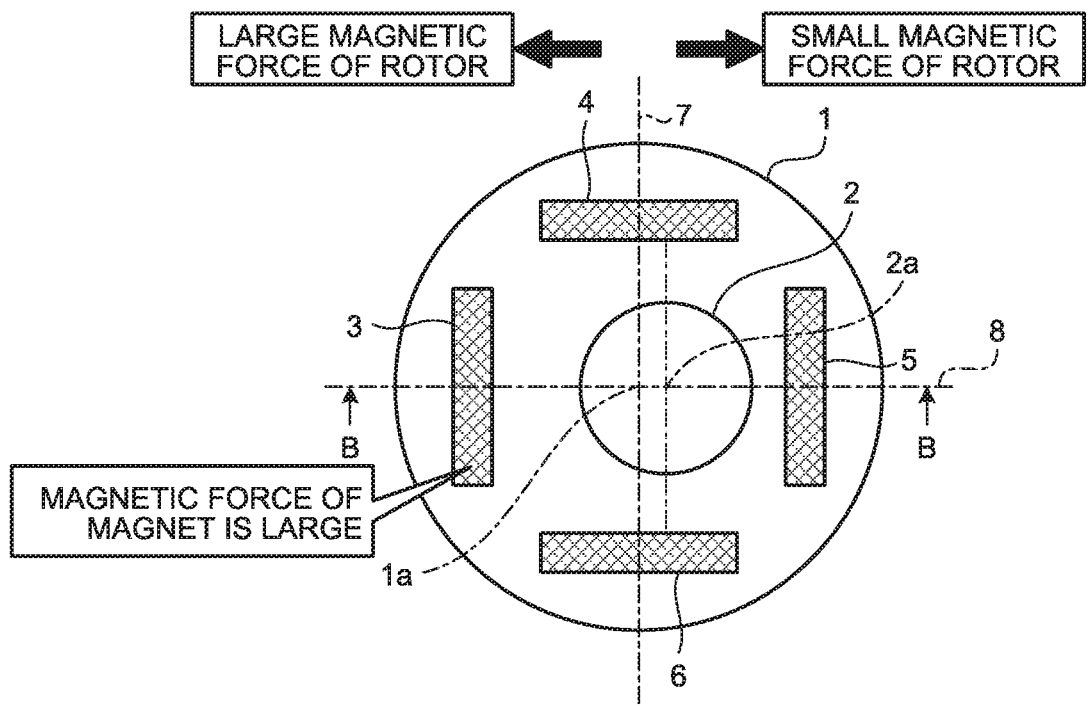
FIG. 8 is a diagram illustrating a first exemplary configuration in which a magnetic force of a magnet included in the rotor in FIG. 2 is varied.

FIG. 8 is a diagram illustrating a first exemplary configuration in which the magnetic force (the residual magnetic flux density Br) of a magnet provided in the rotor in FIG. 2 is varied. In the rotor 1 in the illustrated example, the magnetic force (Br) of the magnet 3 is higher than the magnetic forces (Br) of the other three magnets 4 to 6; this causes the magnetic force of the first portion C in the rotor 1 to be higher than the magnetic force of the second portion D, thereby allowing the rotor 1 to generate non-uniform magnetic attractive forces.

Figure 9:
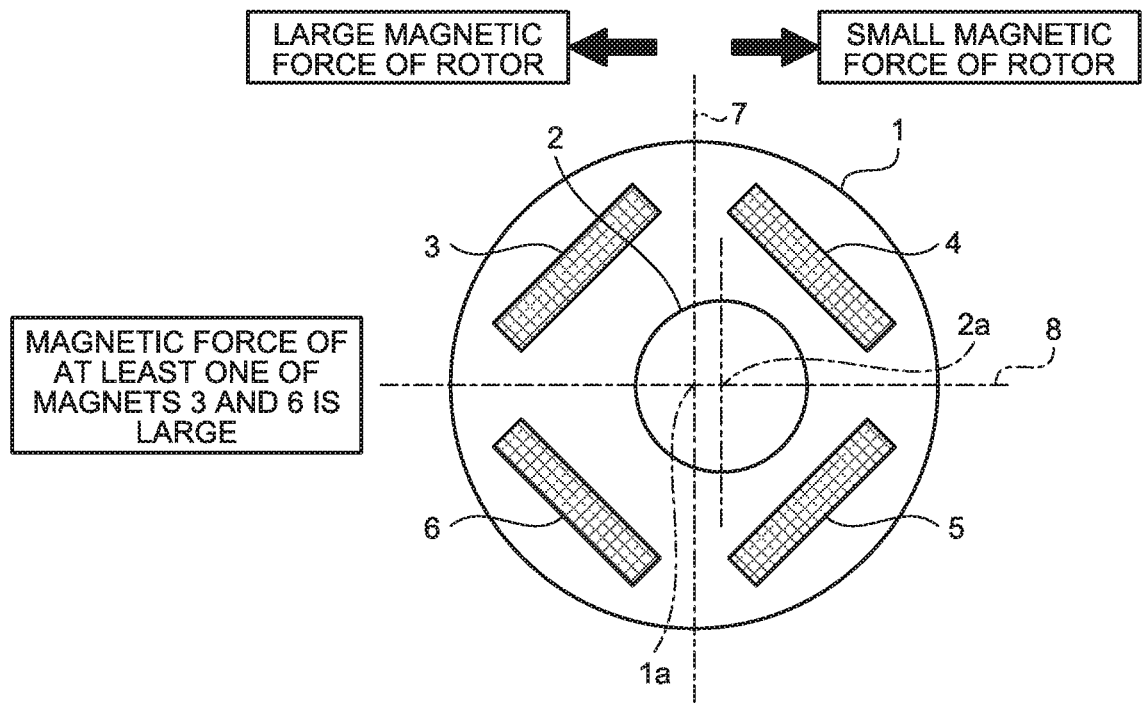
FIG. 9 is a diagram illustrating a second exemplary configuration in which the magnetic force of a magnet included in the rotor in FIG. 2 is varied.

FIG. 9 is a diagram illustrating a second exemplary configuration in which the magnetic force of a magnet included in the rotor in FIG. 2 is varied. In the rotor 1 in the illustrated example, the first portion C includes the two magnets 3 and 6 and the second portion D includes the two magnets 4 and 5. The magnetic force (Br) of at least one magnet of the magnets 3 and 6 is higher than the magnetic force (Br) of each of the magnets 4 and 5. This configuration allows the rotor 1 to generate non-uniform magnetic attractive forces.

Note that the method of heightening a magnetic force of the rotor 1 is not limited to the heightening of the magnetic force (Br) of a magnet; the heightening of a magnetic force of the rotor 1 can be achieved by increasing the volume of a magnet. Specific examples will be described below.

Figure 10:
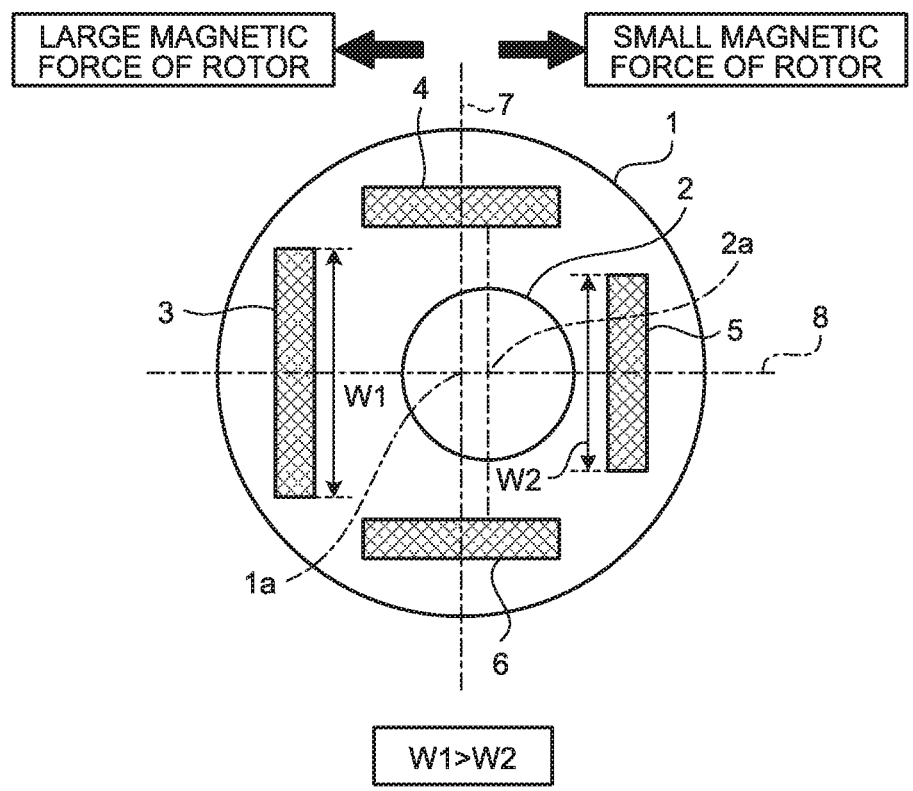
FIG. 10 is a diagram illustrating an example in which a circumferential direction width of the magnet included in the rotor in FIG. 2 is varied.

FIG. 10 is a diagram illustrating an example in which a circumferential direction width of the magnet included in the rotor in FIG. 2 is varied. In the rotor 1 in the illustrated example, a circumferential direction width W1 of the magnet 3 included in the first portion C is formed to be wider than circumferential direction widths W2 of the other three magnets 4 to 6. For convenience of description, although the indication of the circumferential direction widths of the magnet 4 and the magnet 6 is omitted in FIG. 10, these circumferential direction widths are narrower than the circumferential direction width of the magnet 3. In this exemplary configuration, with the assumption that axial direction lengths and radial direction widths are identical among the four magnets 3 to 6, the volume of the magnet 3 is larger than the volume of each of the other three magnets 4 to 6, which leads to heightening of a magnetic force of the first portion C, and, thus, an effect of reducing noise can be expected.

Figure 11:
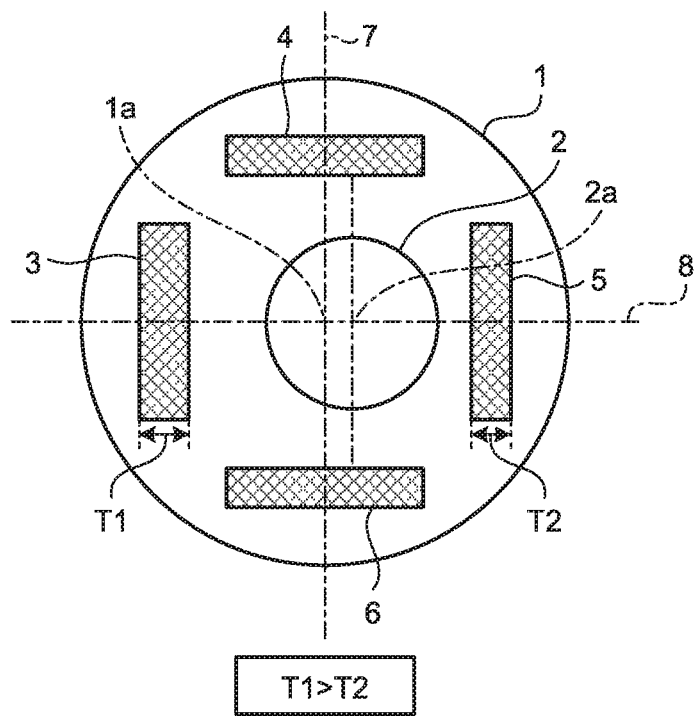
FIG. 11 is a diagram illustrating an example in which a radial direction width of the magnet included in the rotor in FIG. 2 is varied.

FIG. 11 is a diagram illustrating an example in which the radial direction width of the magnet included in the rotor in FIG. 2 is varied. In the rotor 1 in the illustrated example, a radial direction width T1 of the magnet 3 included in the first portion C is formed to be wider than radial direction widths T2 of the other three magnets 4 to 6. For convenience of description, although the indication of the radial direction widths of the magnet 4 and the magnet 6 is omitted in FIG. 11, these radial direction widths are narrower than the radial direction width of the magnet 3. In this exemplary configuration, with the assumption that the axial direction lengths and the circumferential direction widths are identical among the four magnets 3 to 6, the volume of the magnet 3 is larger than the volume of each of the other three magnets 4 to 6, which leads to the heightening of a magnetic force of the first portion C, and thus, an effect of reducing noise can be expected. Furthermore, the enlargement of the radial direction width T1 of the magnet 3, i.e., the magnet width, enhances resistance to a demagnetizing field, and, thus, improvement of a demagnetization durability can be expected.

Figure 12:
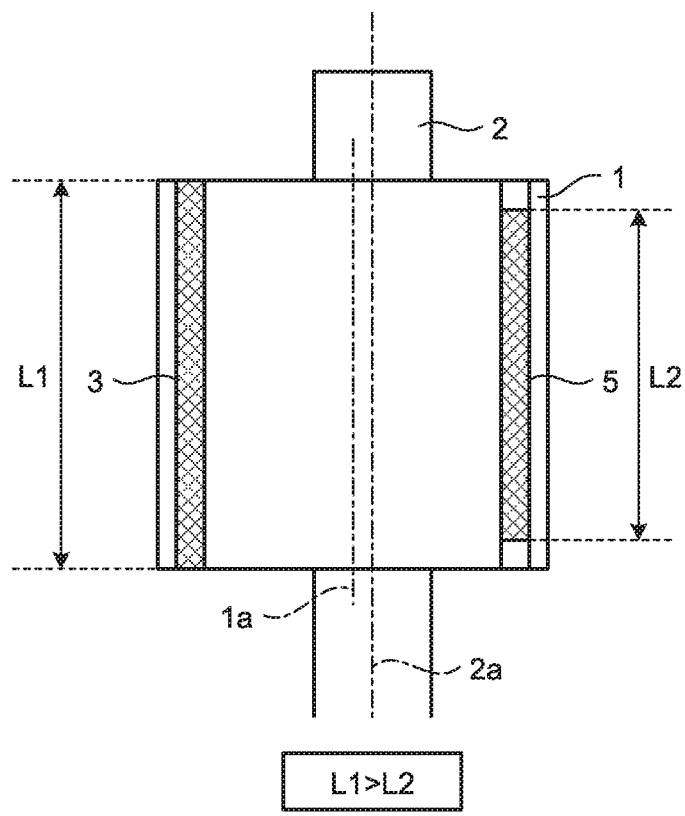
FIG. 12 is a diagram illustrating an example in which an axial direction length of the magnet included in the rotor in FIG. 2 is varied.

FIG. 12 is a diagram illustrating an example in which the axial direction length of the magnet included in the rotor in FIG. 2 is varied. In the rotor 1 in the illustrated example, an axial direction length L1 of the magnet 3 included in the first portion C is formed to be longer than axial direction lengths L2 of the other three magnets 4 to 6. For convenience of description, although the indication of the magnet 4 to the magnet 6 is omitted in FIG. 12, these axial direction lengths are shorter than the axial direction length L1 of the magnet 3. In this exemplary configuration, with the assumption that the radial direction widths and the circumferential direction widths are identical among the four magnets 3 to 6, the volume of the magnet 3 is larger than the volume of each of the other three magnets 4 to 6, which leads to the heightening of a magnetic force of the first portion C, and, thus, an effect of reducing noise can be expected.

The examples of the heightening of a magnetic force illustrated in FIG. 10 to FIG. 12 can be combined; by combination, an effect greater than that of one of the examples of the heightening of a magnetic force can be obtained.

As described above, the compressor 11 according to the first embodiment is configured such that the axis center 2a of the rotating shaft 2 for transmitting the rotation of the rotor 1 to the compressing unit 40 for compressing a refrigerant is offset from the radial direction center (the rotor center 1a) of the rotor 1; and, when the rotor 1 is divided into, with respect to the rotor center 1a, a first portion C located on the side in the direction from the axis center 2a to the rotor center 1a and a second portion D located on the side in the direction from the rotor center 1a to the axis center 2a, the magnetic force of the first portion C is stronger than the magnetic force of the second portion D. This configuration allows the rotor 1 to generate non-uniform magnetic attractive forces during the rotation of the rotor 1 and thereby can suppress vibration generated due to rotation of an eccentric portion of the compressing unit 40 and reduce noise. Additionally, the usage of the balance weights 30 and 31, which are vibration-suppressing components, can be reduced or eliminated; thus, vibration and noise can be reduced while keeping a low cost.

Second Embodiment

Figure 13:
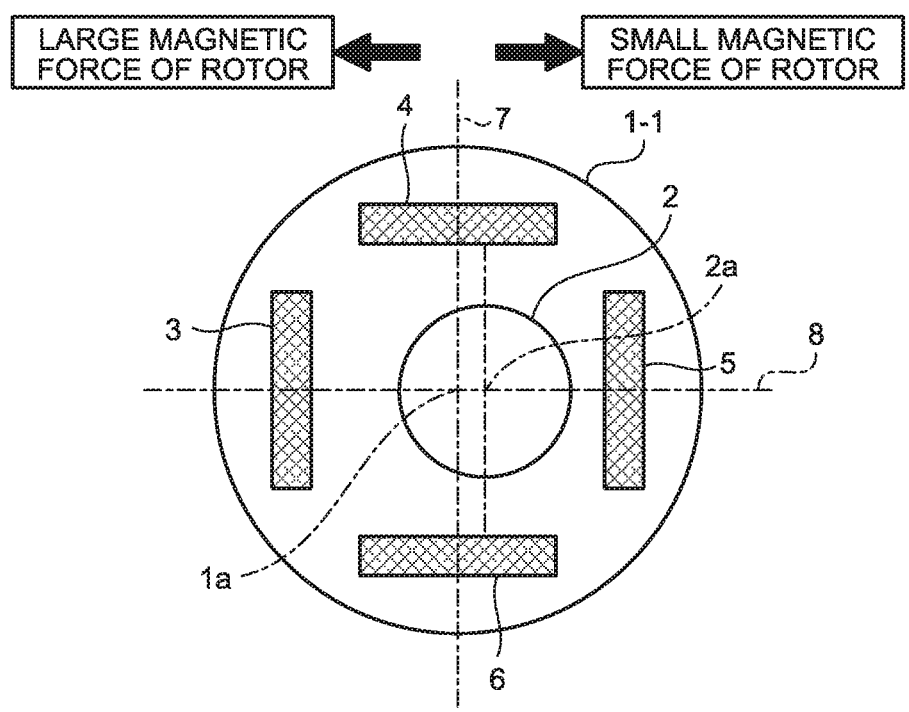
FIG. 13 is a sectional view of a first split rotor for use in a compressor according to a second embodiment of the present invention.
Figure 14:
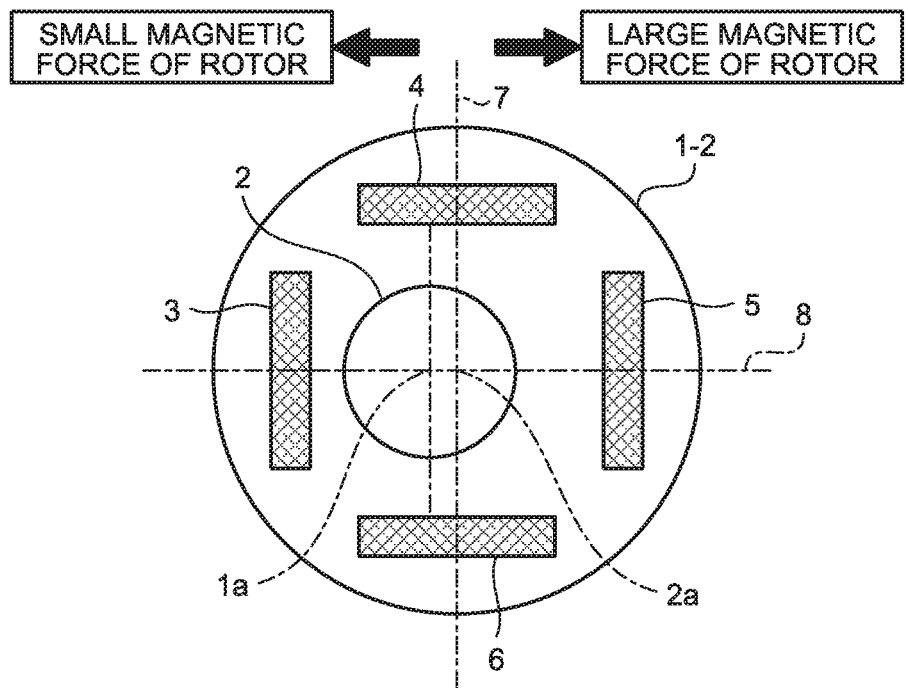
FIG. 14 is a sectional view of a second split rotor for use in the compressor according to the second embodiment of the present invention.
Figure 15:
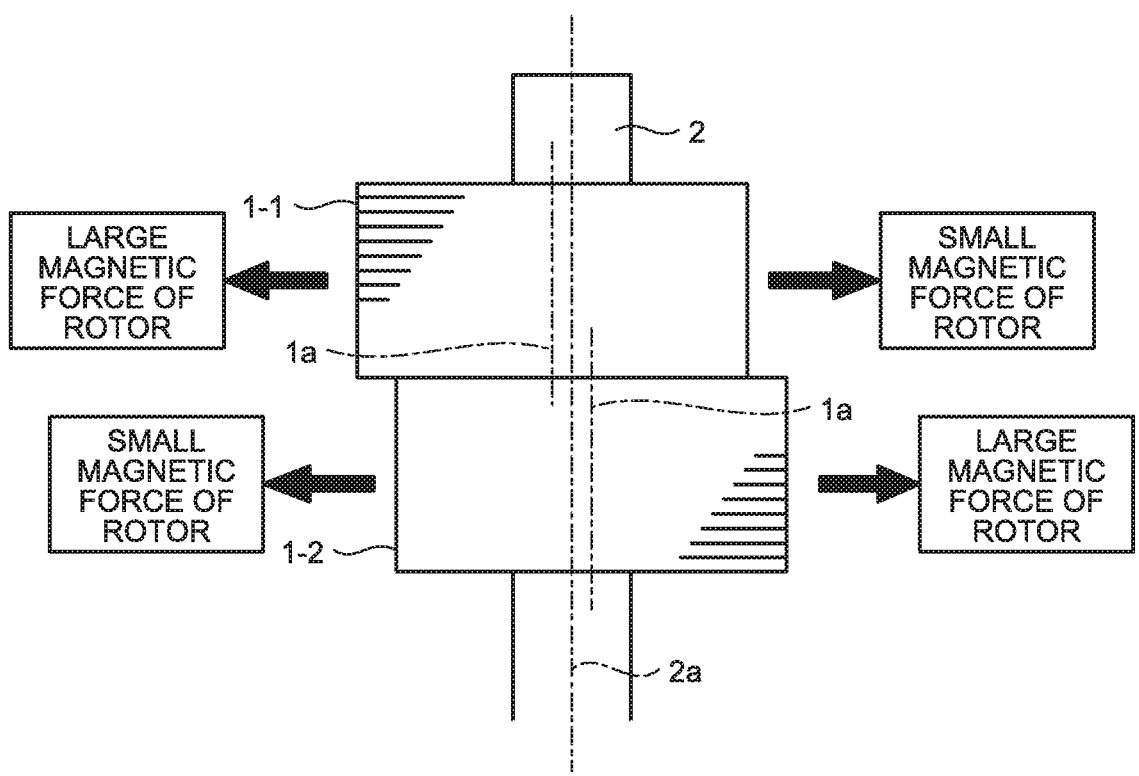
FIG. 15 is a side view of the first split rotor in FIG. 13 and the second split rotor in the FIG. 14.

FIG. 13 is a sectional view of a first split rotor for use in a compressor according to a second embodiment of the present invention. FIG. 14 is a sectional view of a second split rotor for use in the compressor according to the second embodiment of the present invention. FIG. 15 is a side view of the first split rotor in FIG. 13 and the second split rotor in FIG. 14. A difference of the second embodiment from the first embodiment is that the rotor is constituted by the two rotors which are split in an axial direction of the rotating shaft 2, the magnetic force of the first portion C is stronger than the magnetic force of the second portion D in each of the rotors, and, among the two rotors, the first portion C of one rotor (1-1) and the first portion C of the other rotor (1-2) are disposed symmetrically with respect to the axis center 2a of the rotating shaft 2. Components identical with those in the first embodiment are designated with identical symbols and their description will be omitted, so that different components only will be described hereinafter.

A first split rotor 1-1 is located on one side on the rotating shaft 2 in the axial direction, and a second split rotor 1-2 is located on the other side on the rotating shaft 2 in the axial direction. The axis center 2a is offset from the rotor center 1a, and the first split rotor 1-1 is configured such that the magnetic force of the first portion C is stronger than the magnetic force of the second portion D (see FIG. 13). In the example in FIG. 13, the first portion C is on the left side of the boundary surface 7, and the second portion D is on the right side of the boundary surface 7. The second split rotor 1-2 is configured such that the magnetic force of the first portion C is stronger than the magnetic force of the second portion D (see FIG. 14). In the example in FIG. 14, the first portion C is on the right side of the boundary surface 7, and the second portion D is on the left side of the boundary surface 7. The first portion C of the first split rotor 1-1 and the first portion C of the second split rotor 1-2 are disposed symmetrically with respect to the axis center 2a of the rotating shaft 2 (see FIG. 15).

By placing the first split rotor 1-1 and the second split rotor 1-2 as in FIG. 15, the rotor center 1a of the first split rotor 1-1 is offset from the axis center 2a toward the left side, and the rotor center 1a of the second split rotor 1-2 is offset from the axis center 2a to the right side. The magnetic force of each of the rotors in a portion on a side toward which the offset is made, i.e., the first portion C, is increased. Such a configuration allows the magnetic attractive force in a left direction to be larger than the magnetic attractive force in a right direction in the first split rotor 1-1 and the magnetic attractive force in the right direction to be larger than the magnetic attractive force in the left direction in the second split rotor 1-2, and thus, an effect similar to that in the first embodiment can be expected.

Figure 16:
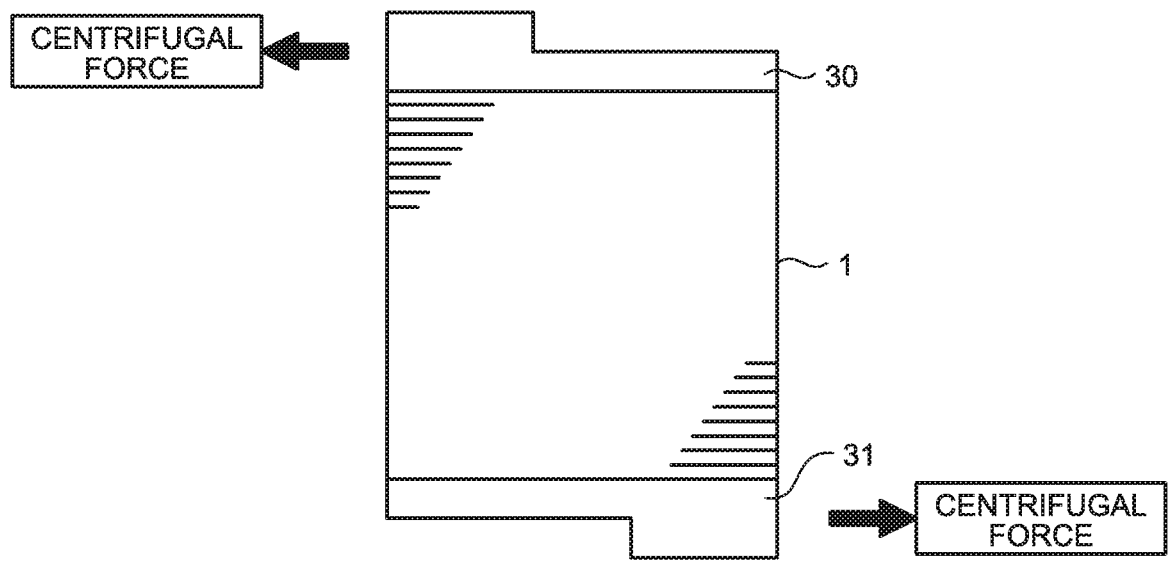
FIG. 16 is a side view of a conventional rotor including two balance weights.

FIG. 16 is a side view of a conventional rotor having two balance weights. The rotor 1 illustrated in FIG. 16 is similar to the rotor 1 illustrated in FIG. 6, and the position of the rotor center 1a coincides with the position of the axis center 2a as described above. Thus, the dimensions of the gaps G1 and G2 are constant, which causes the magnetic attractive force generated between the rotor 1 and the stator core 23 during the rotation of the rotor 1 to be uniform. Hence, in order to suppress a deflection in the rotating shaft 2 due to rotation of an eccentric portion of the compressing unit 40, a measure such as placing the balance weight 30 on one end of the rotor 1 and placing the balance weight 31 on the other end of the rotor 1 has to be taken. Each of the two balance weights has a shape such that there is imbalance of the center of gravity and is attached in an orientation to cancel a deflection in the rotating shaft 2. In the example in FIG. 16, the centrifugal force of the upper balance weight 30 acts in the left direction, and the centrifugal force of the lower balance weight 31 acts in the right direction. This cancels the deflection in the rotating shaft 2 resulting from the rotation of an eccentric portion and can thereby suppress vibration and noise. These balance weights 30 and 31, however, have large specific gravity and are desirably made of a material that does not allow magnetic flux generated in the rotor 1 to pass therethrough (having low magnetic permeability) and thus generally made of brass. Brass is expensive and a method that employs no brass is desirable to reduce cost.

In contrast, the magnetic attractive force in the left direction is relatively large in the first split rotor 1-1 illustrated in FIG. 15, and the magnetic attractive force in the right direction is relatively large in the second split rotor 1-2. Thus, an effect similar to that of the case including the balance weights 30 and 31 can be obtained and, moreover, the need to use an expensive material is eliminated, which can reduce cost.

Figure 17:
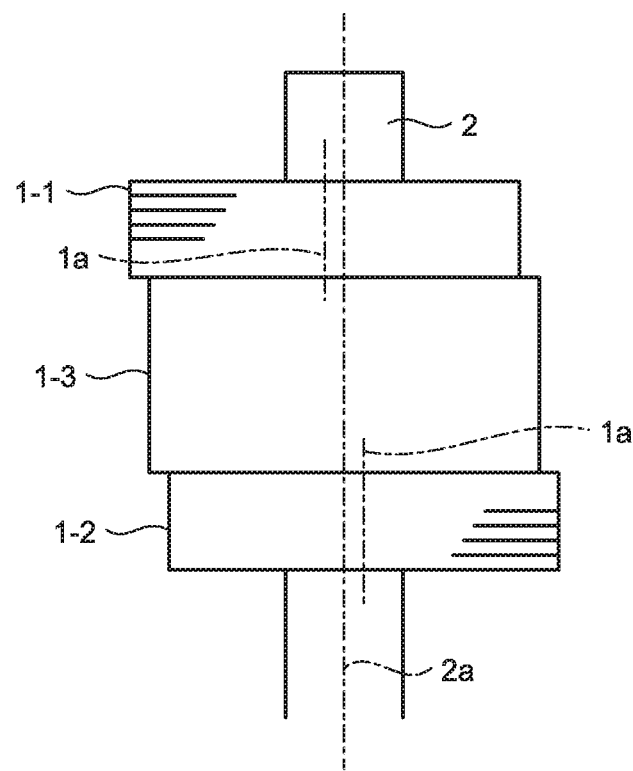
FIG. 17 is a side view of a plurality of split rotors split into three in an axial direction of a rotating shaft.
Figure 18:
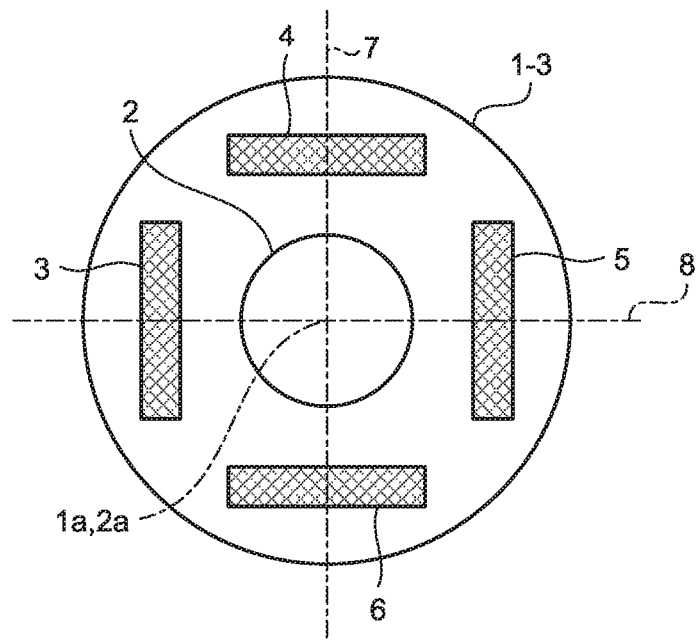
FIG. 18 is a sectional view of a split rotor located at an axial direction center in FIG. 17.

FIG. 17 is a side view of a plurality of split rotors split into three in the axial direction of the rotating shaft. FIG. 18 is a sectional view of a split rotor located at an axial direction center in FIG. 17. As illustrated in FIG. 18, a third split rotor 1-3 is formed such that the rotor center 1a coincides with the axis center 2a. As illustrated in FIG. 17, the third split rotor 1-3 is disposed between the first split rotor 1-1 and the second split rotor 1-2. As described above, the number of split rotors for use in the compressor 11 according to the second embodiment is not limited to two; three split rotors may be used as in FIG. 17, or four or more split rotors may be used.

Some exemplary configurations that cause the magnetic force of the first portion C to be stronger than the magnetic force of the second portion D in each split rotor will now be described.

Figure 19:
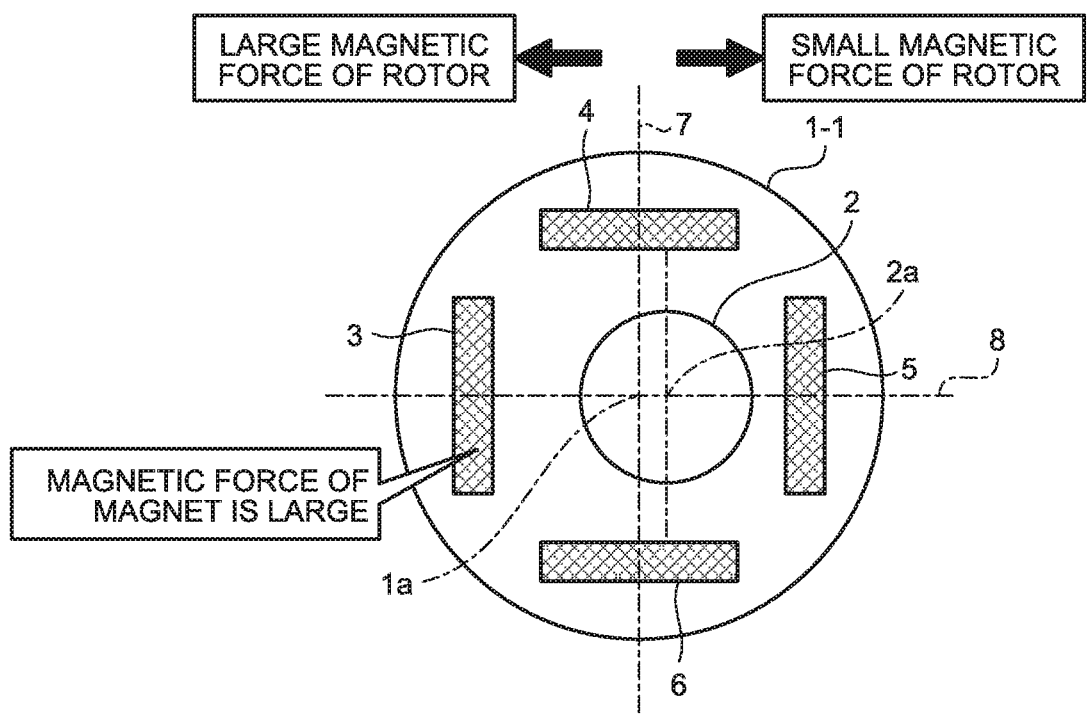
FIG. 19 is a diagram illustrating an exemplary configuration in which the magnetic force of the magnet included in the split rotor in FIG. 13 is varied.
Figure 20:
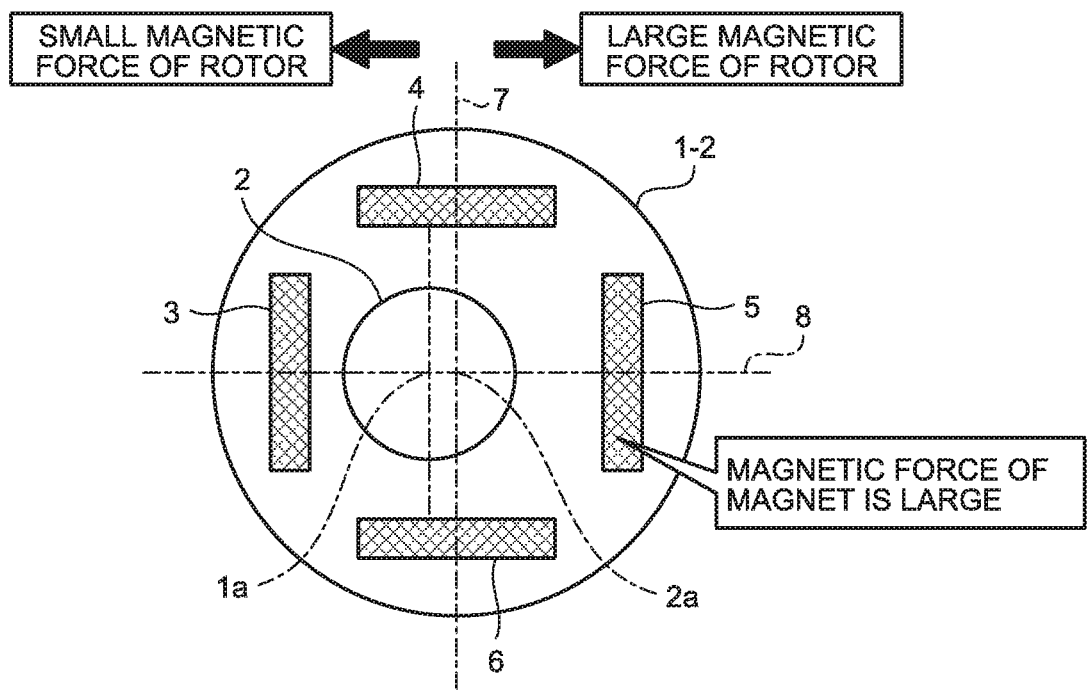
FIG. 20 is a diagram illustrating an exemplary configuration in which the magnetic force of a magnet included in the split rotor in FIG. 14 is varied.
Figure 21:
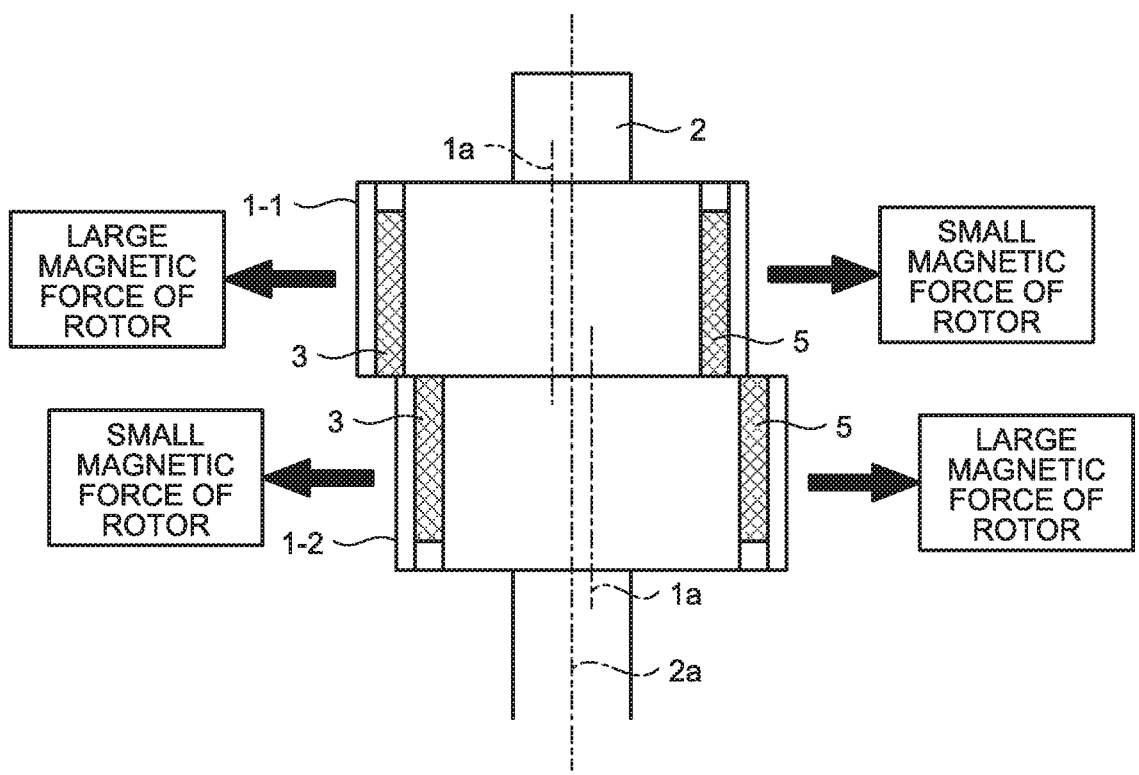
FIG. 21 is a sectional view of the split rotors illustrated in FIG. 19 and FIG. 20.

FIG. 19 is a diagram illustrating an exemplary configuration in which the magnetic force of the magnet included in the split rotor in FIG. 13 is varied. FIG. 20 is a diagram illustrating an exemplary configuration in which the magnetic force of a magnet included in the split rotor in FIG. 14 is varied. FIG. 21 is a sectional view of the split rotors illustrated in FIG. 19 and FIG. 20.

In the first split rotor 1-1 in FIG. 19, the magnetic force (Br) of the magnet 3 is higher than the magnetic forces (Br) of the other three magnets 4 to 6; this causes the magnetic force of the first portion C in the first split rotor 1-1 to be higher than the magnetic force of the second portion D, thereby causing the first split rotor 1-1 to generate non-uniform magnetic attractive forces. In the second split rotor 1-2 in FIG. 20, the magnetic force (Br) of the magnet 5 is higher than the magnetic forces (Br) of the other three magnets 3, 4, and 6; this causes the magnetic force of the first portion C in the second split rotor 1-2 to be higher than the magnetic force of the second portion D, thereby causing the second split rotor 1-2 to generate non-uniform magnetic attractive forces. Thus, by placing the first split rotor 1-1 and the second split rotor 1-2 as in FIG. 21, an effect similar to that of the case including the balance weights 30 and 31 can be expected.

Note that the method of heightening a magnetic force of each of the split rotors is not limited to the heightening of the magnetic force (Br) of a magnet; the heightening of a magnetic force of each of the split rotors can be achieved by increasing the volume of a magnet. Specific examples will be described below.

Figure 22:
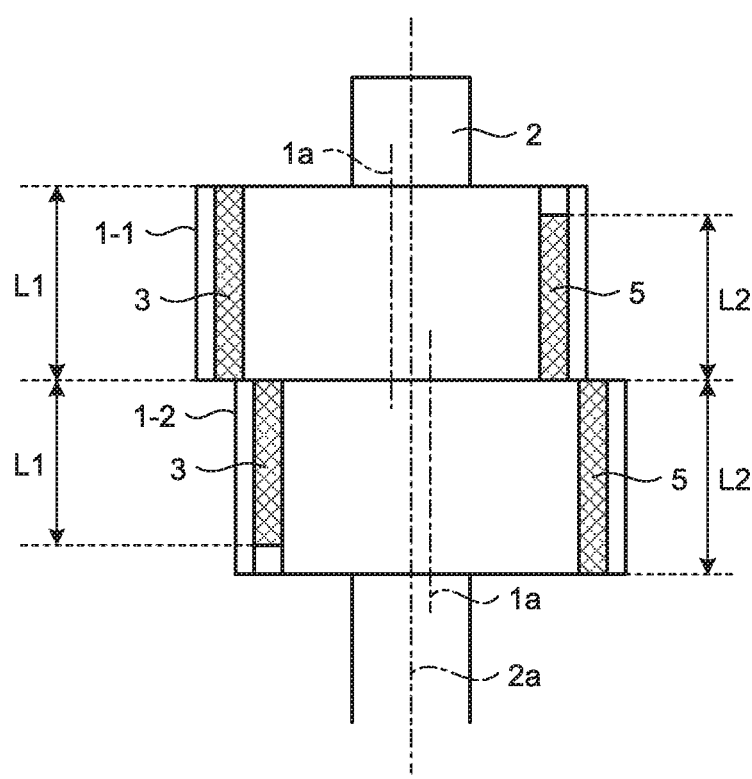
FIG. 22 is a diagram illustrating an example in which the axial direction length of the magnet included in each of the split rotors in FIG. 15 in varied.

FIG. 22 is a diagram illustrating an example in which the axial direction length of the magnets included in each of the split rotors in FIG. 15 is varied. In the first split rotor 1-1, the axial direction length L1 of the magnet 3 included in the first portion C is formed such that the axial direction length L1 of the magnet 3 is longer than the axial direction lengths L2 of the other three magnets 4 to 6. In the second split rotor 1-2, the axial direction length L2 of the magnet 5 included in the first portion C is formed such that the axial direction length L2 of the magnet 5 is longer than the axial direction lengths L1 of the other three magnets 3, 4, and 6.

For convenience of description, the indication of the magnet 4 and the magnet 6 is omitted in FIG. 22, although the axial direction lengths of the magnet 4 and the magnet 6 included in the first split rotor 1-1 are shorter than the axial direction length L1 of the magnet 3. Similarly, the axial direction lengths of the magnet 4 and the magnet 6 included in the second split rotor 1-2 are shorter than the axial direction length L2 of the magnet 5.

In this exemplary configuration, with the assumption that the radial direction widths and the circumferential direction widths are identical among the four magnets 3 to 6, the volume of the magnet 3 included in the first split rotor 1-1 is larger than the volume of each of the other three magnets 4 to 6, and the volume of the magnet 5 included in the second split rotor 1-2 is larger than the volume of each of the other three magnets 3, 4, and 6. This leads to the heightening of a magnetic force of the first portion C in each of the split rotors, and, thus, an effect of reducing noise can be expected.

Figure 23:
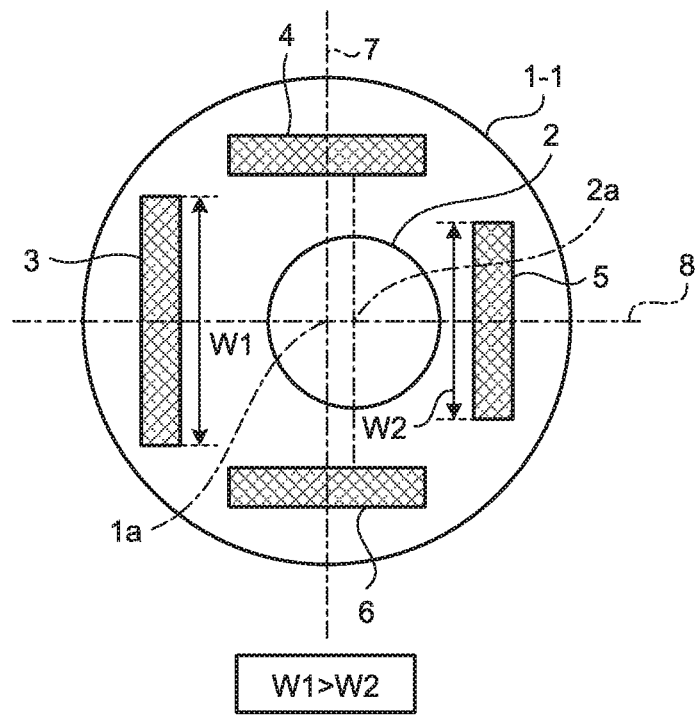
FIG. 23 is a diagram illustrating an example in which the circumferential direction width of the magnet included in the split rotor in FIG. 13 is varied.
Figure 24:
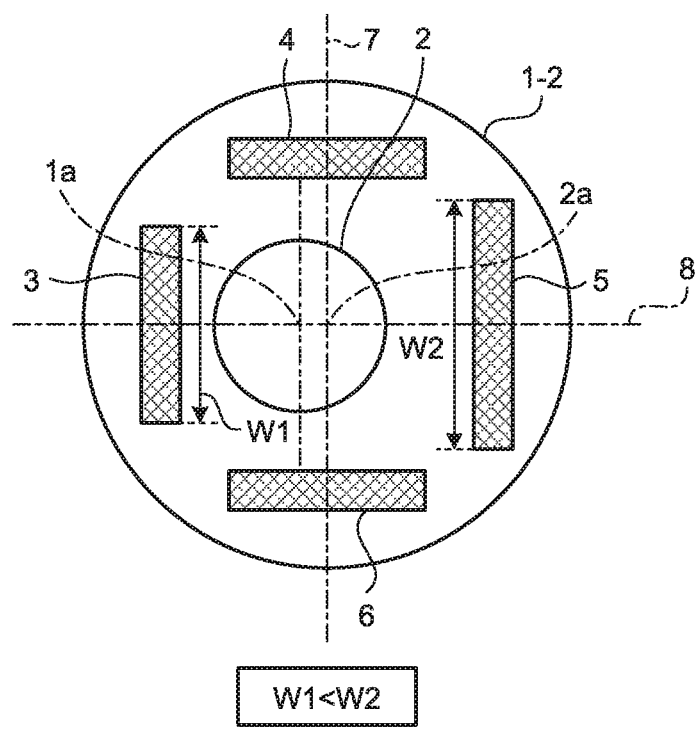
FIG. 24 is a diagram illustrating an example in which the circumferential direction width of the magnet included in the split rotor in FIG. 14 is varied.

FIG. 23 is a diagram illustrating an example in which the circumferential direction width of the magnet included in the split rotor in FIG. 13 is varied. FIG. 24 is a diagram illustrating an example in which the circumferential direction width of the magnet included in the split rotor in FIG. 14 is varied. In the first split rotor 1-1 in FIG. 23, the circumferential direction width W1 of the magnet 3 included in the first portion C is formed to be wider than the circumferential direction widths W2 of the other three magnets 4 to 6. In the second split rotor 1-2 in FIG. 24, the circumferential direction width W2 of the magnet 5 included in the first portion C is formed to be wider than the circumferential direction widths W1 of the other three magnets 3, 4, and 6.

In this exemplary configuration, with the assumption that the axial direction lengths and the radial direction widths are identical among the four magnets 3 to 6, the volume of the magnet 3 in the first split rotor 1-1 is larger than the volume of each of the other three magnets 4 to 6, and the volume of the magnet 5 in the second split rotor 1-2 is larger than the volume of each of the other three magnets 3, 4, and 6. This leads to the heightening of a magnetic force of the first portion C in each of the split rotors, and, thus, an effect of reducing noise can be expected.

Figure 25:
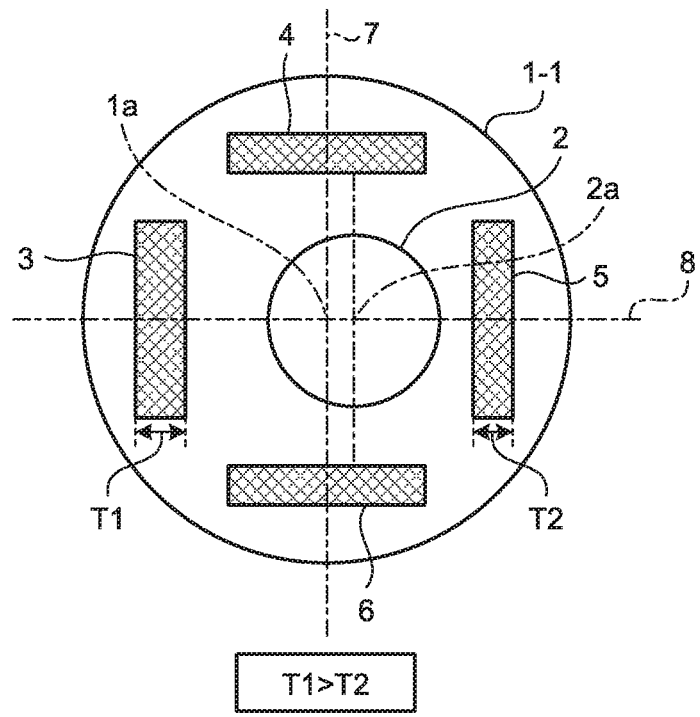
FIG. 25 is a diagram illustrating an example in which the radial direction width of the magnet included in the split rotor in FIG. 13 is varied.
Figure 26:
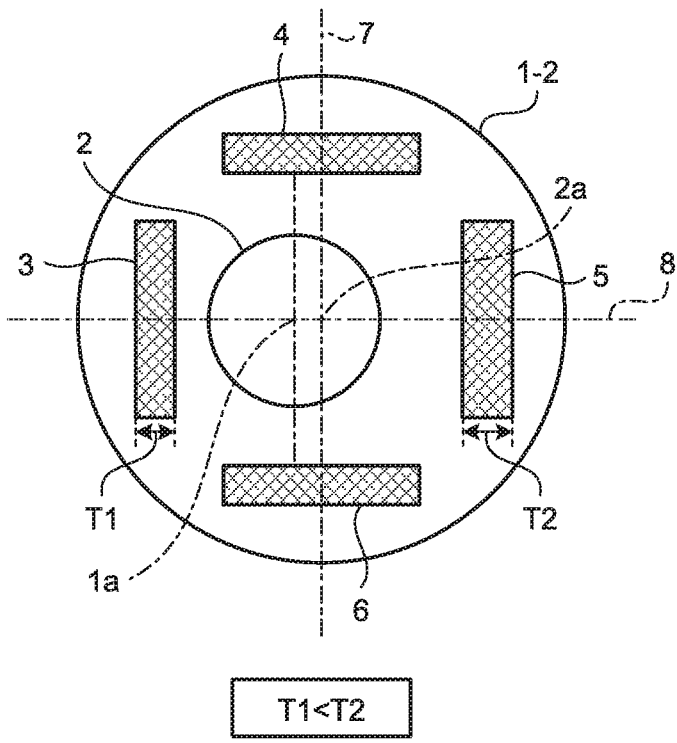
FIG. 26 is a diagram illustrating an example in which the radial direction width of the magnet included in the split rotor in FIG. 14 is varied.
Figure 27:
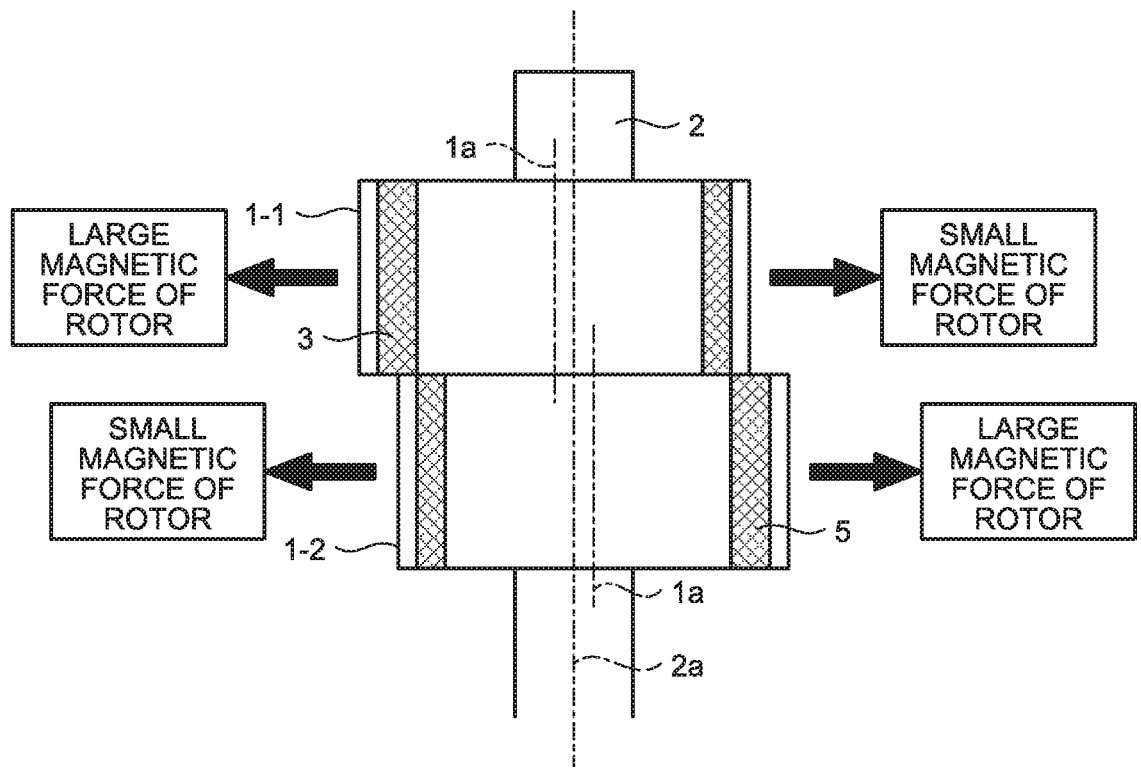
FIG. 27 is a sectional view of the split rotors illustrated in FIG. 25 and FIG. 26.

FIG. 25 is a diagram illustrating an example in which the radial direction width of the magnet included in the split rotor in FIG. 13 is varied. FIG. 26 is a diagram illustrating an example in which the radial direction width of the magnet included in the split rotor in FIG. 14 is varied. FIG. 27 is a sectional view of the split rotors illustrated in FIG. 25 and FIG. 26. In the first split rotor 1-1 in FIG. 25, the radial direction width T1 of the magnet 3 included in the first portion C is formed to be wider than the radial direction widths T2 of the other three magnets 4 to 6. In the second split rotor 1-2 in FIG. 26, the radial direction width T2 of the magnet 5 included in the first portion C is formed to be wider than the radial direction widths T1 of the other three magnets 3, 4, and 6.

In this exemplary configuration, with the assumption that the axial direction lengths and the circumferential direction widths are identical among the four magnets 3 to 6, the volume of the magnet 3 in the first split rotor 1-1 is larger than the volume of each of the other three magnets 4 to 6, and the volume of the magnet 5 in the second split rotor 1-2 is larger than the volume of each of the other three magnets 3, 4, and 6. This leads to the heightening of a magnetic force of each of the first portions C, and, thus, an effect of reducing noise can be expected. Furthermore, the enlargement of the radial direction width T1 of the magnet 3 of the first split rotor 1-1 and the radial direction width T2 of the magnet 5 of the second split rotor 1-2 enhances the resistance to a demagnetizing field, and, thus, improvement of a demagnetization strength can be expected.

Figure 28:
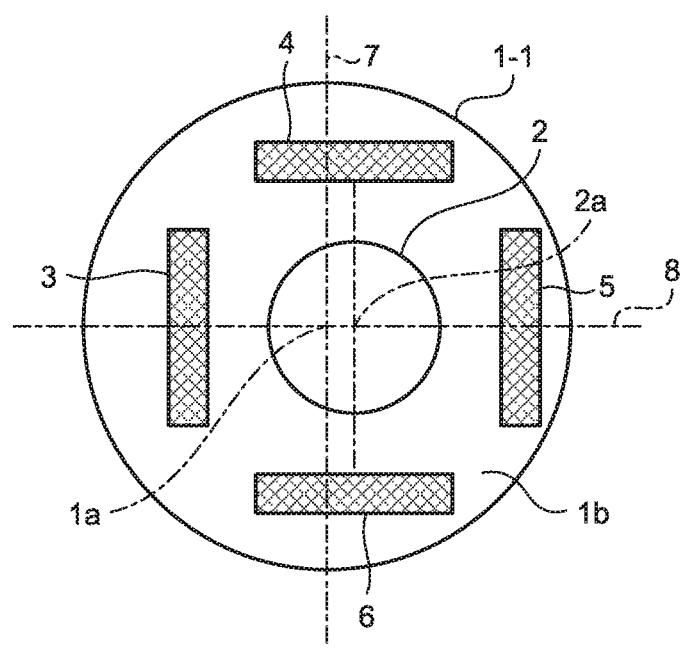
FIG. 28 is a diagram illustrating an example in which the position of a magnet insertion hole in the split rotor in FIG. 13 is varied.
Figure 29:
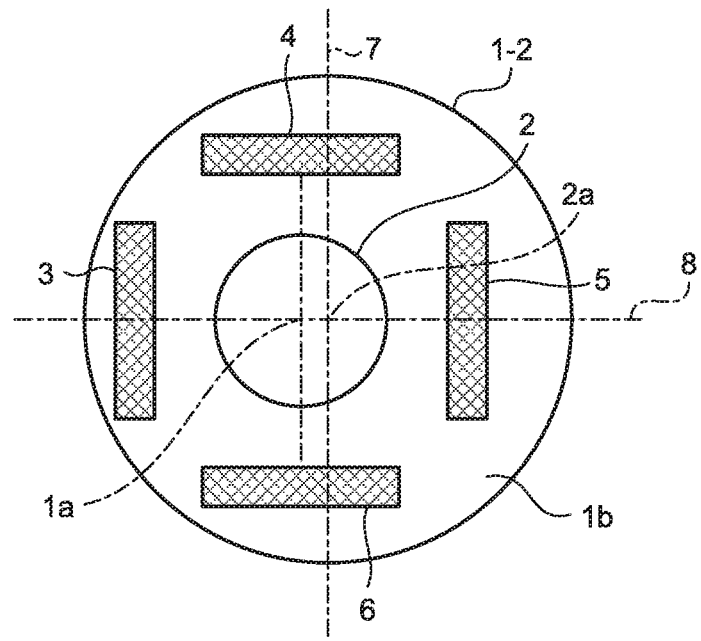
FIG. 29 is a diagram illustrating an example in which the position of a magnet insertion hole in the split rotor in FIG. 14 is varied.
Figure 30:
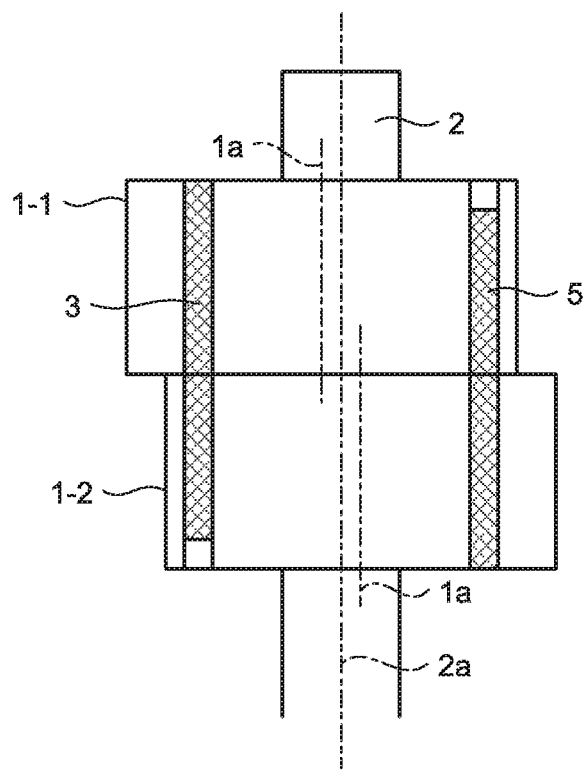
FIG. 30 is a sectional view of the split rotors illustrated in FIG. 28 and FIG. 29.

FIG. 28 is a diagram illustrating an example in which the position of a magnet insertion hole in the split rotor in FIG. 13 is varied. FIG. 29 is a diagram illustrating an example in which the position of a magnet insertion hole in the split rotor in FIG. 14 is varied. FIG. 30 is a sectional view of the split rotors illustrated in FIG. 28 and FIG. 29. In the first split rotor 1-1 and the second split rotor 1-2, magnet insertion holes in each of rotor cores 1b are formed such that a length from each of the four magnets 3 to 6 to the axis center 2a is equal.

In this exemplary configuration, the four magnets 3 to 6 can be shared between the split rotors as illustrated in FIG. 30. That is, the magnet 3 of the first split rotor 1-1 and the magnet 3 of the second split rotor 1-2 can be integrally formed; this is similarly applicable to the other three magnets 4 to 6. By using four integrally formed magnets 3 to 6, the number of magnets to be fabricated can be reduced. Here, the integrally formed magnet 3 is fabricated such that its axial direction length is shorter than the length from one end of the first split rotor 1-1 to the other end of the second split rotor 1-2. The integrally formed magnet 5 is fabricated similarly. Then, after the insertion of the magnet 3 and the magnet 5 in each of the split cores as in FIG. 30, the magnet 3 is shifted to an axial direction end portion side of the first split rotor 1-1, and the magnet 5 is shifted to an axial direction end portion side of the second split rotor 1-2. This allows imitation of a structure similar to that illustrated in FIG. 22, and, as a result, noise can be reduced.

The examples of the heightening of a magnetic force illustrated in FIG. 19 to FIG. 27 can be combined; by combining these examples, an effect greater than that of one of the examples of the heightening of a magnetic force can be obtained.

As described above, in the compressor 11 according to the second embodiment, the rotor is divided into the two rotors split in the axial direction of the rotating shaft 2, the magnetic force of the first portion C is stronger than the magnetic force of the second portion D in each of the rotors, and the first portion C of the first split rotor 1-1 and the first portion C of the second split rotor 1-2 are disposed symmetrically with respect to the axis center 2a of the rotating shaft 2. This configuration generates magnetic imbalance in different directions in the split rotors, and this magnetic imbalance acts in a direction to cancel a force to swing during rotation (a moment) due to the rotation of an eccentric portion and, thus, can suppress vibration to be generated due to the rotation of the eccentric portion and also reduce noise.

Figure 31:
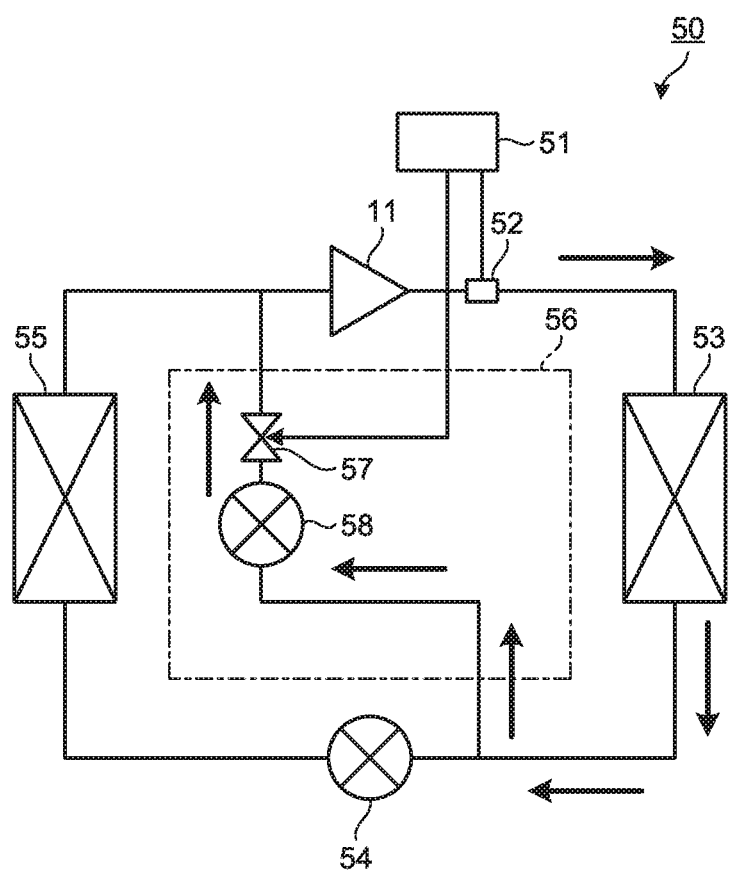
FIG. 31 is a diagram illustrating one exemplary configuration of a refrigeration cycle apparatus including the compressor according to the first or second embodiment of the present invention.

FIG. 31 is a diagram illustrating one exemplary configuration of a refrigeration cycle apparatus 50 including the compressor according to the first and second embodiments of the present invention. The refrigeration cycle apparatus 50 includes the compressor 11, a condenser 53, a decompression device 54, an evaporator 55, a temperature sensor 52, a bypass circuit 56, and a control circuit 51. The bypass circuit 56 includes a decompression device 58 and an on-off valve 57 that are connected in series and is present between a liquid refrigerant outlet port of the condenser 53 and a gas inlet port of the compressor 11. The temperature sensor 52 is disposed in a vicinity of a gas outlet port of the compressor 11 to detect a temperature of the refrigerant flowing through the gas outlet port. The control circuit 51 controls the on-off valve 57 on the basis of a detection result of the temperature sensor 52. The refrigeration cycle apparatus 50 is suitable for, for example, an air conditioner.

The operation will be described below. In a normal operation of the refrigeration cycle apparatus 50, a refrigeration cycle is performed in which a refrigerant is circulated in the following order the compressor 11, the condenser 53, the decompression device 54, the evaporator 55, and it is returned back to the compressor 11. A refrigerant gas having a high temperature and a high pressure resulting from compression by the compressor 11 is subjected to heat exchange with air at the condenser 53 to condense to a liquid refrigerant. The liquid refrigerant expands at the decompression device 54 into a refrigerant gas having a low temperature and a low pressure and is subjected to heat exchange with air at the evaporator 55 to evaporate, and the compressor 11 performs compression again to produce the refrigerant gas having a high temperature and a high pressure.

At an accumulator 12 (see FIG. 1), some of the refrigerant liquid that does not evaporate at the evaporator 55 is separated, and the refrigerant gas having a low temperature and a low pressure admitted through an inlet pipe 13 to the compressing unit 40 is compressed by the compressing unit 40. The refrigerant gas having a high temperature and a high pressure flows through a plurality of through holes (not shown) formed in the rotor 1 and the gaps G1 and G2 (see FIG. 7) and is discharged from an outlet pipe 15.

By using the compressor 11 according to the first and second embodiments of the present invention in this manner, the refrigeration cycle apparatus 50 that is capable of reducing vibration and noise while keeping cost low can be provided.

The configurations presented in the embodiments described above are example configurations of the present invention; it is possible to combine these configurations with other publicly known techniques, and it is of course possible to make a configuration with a modification, such as a partial omission, without departing from the spirit of the present invention.

INDUSTRIAL APPLICABILITY

As described above, the present invention can be applied to a compressor, a refrigeration cycle apparatus, and an air conditioner and is particularly useful as an invention that can suppress vibration while keeping cost low.

The invention claimed is:
1. A compressor comprising:
a motor including:
a stator with an inner diameter side,
a rotating shaft that has an axis center,
a rotor that has a plurality of magnets, that has a radial direction center, and that is disposed in the inner diameter side of the stator and the rotating shaft, the radial direction center of the rotor is offset from the axis center of the rotating shaft; and
a compressing unit driven by rotation of the rotating shaft for compressing a refrigerant, wherein
at least two of the plurality of magnets are arranged asymmetrically with respect to the axis center,
the rotor of the motor includes, with respect to the radial direction center of the rotor, a first portion located on a first side in a direction from the axis center of the rotating shaft to the radial direction center of the rotor and a second portion located on a second side in a direction from the radial direction center of the rotor to the axis center of the rotating shaft, and
the rotor is divided into at least two rotors split in an axial direction of the rotating shaft, the at least two rotors being arranged symmetrically with respect to the axis center of the rotating shaft and offset from each other.

2. The compressor according to claim 1, wherein the magnetic force of the first portion is stronger than the magnetic force of the second portion in each of the rotors.

3. The compressor according to claim 2, wherein a rotor formed such that the radial direction center of the rotor coincides with the axis center of the rotating shaft is disposed between the one rotor and the other rotor.

4. The compressor according to claim 1, wherein a magnetic force of a magnet disposed in the first portion is stronger than a magnetic force of a magnet disposed in the second portion.

5. The compressor according to claim 1, wherein a shape of the magnet disposed in the first portion is different from a shape of the magnet disposed in the second portion such that the magnetic force of the first portion is stronger than the magnetic force of the second portion.

6. A refrigeration cycle apparatus, comprising the compressor according to claim 1.

7. An air conditioner, comprising the refrigeration cycle apparatus according to claim 6.

8. The compressor according to claim 1, wherein, of gaps between an outer circumferential surface of the rotor and an inner circumferential surface of a stator core, a gap on a side of the first portion is narrower than a gap on a side of the second portion.

* * * * *